July 5, 1927.
G. S. MORISON
BALL TRANSMISSION
Filed June 19, 1926
1,634,507
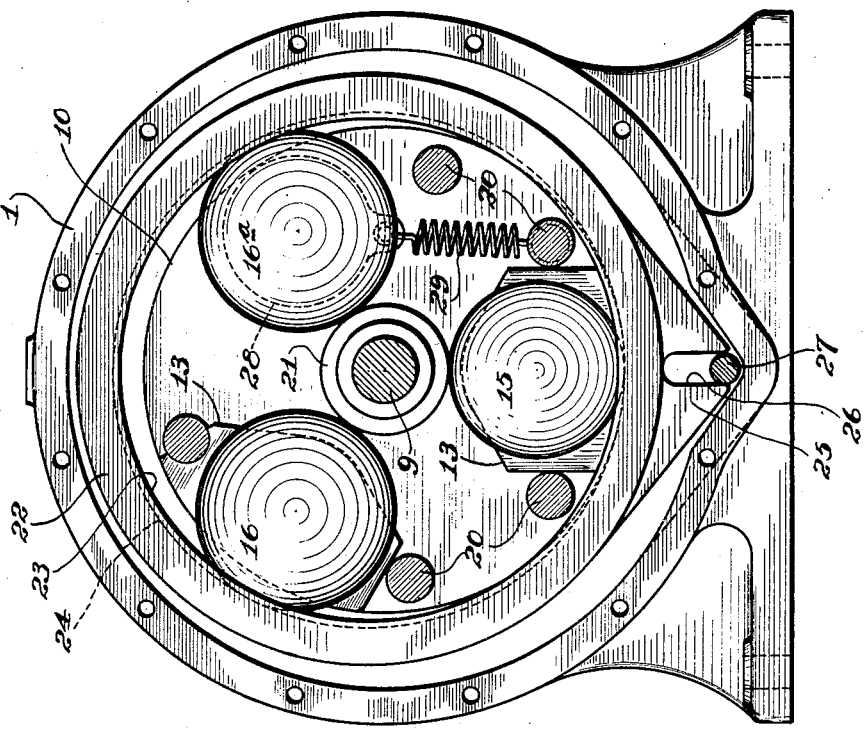
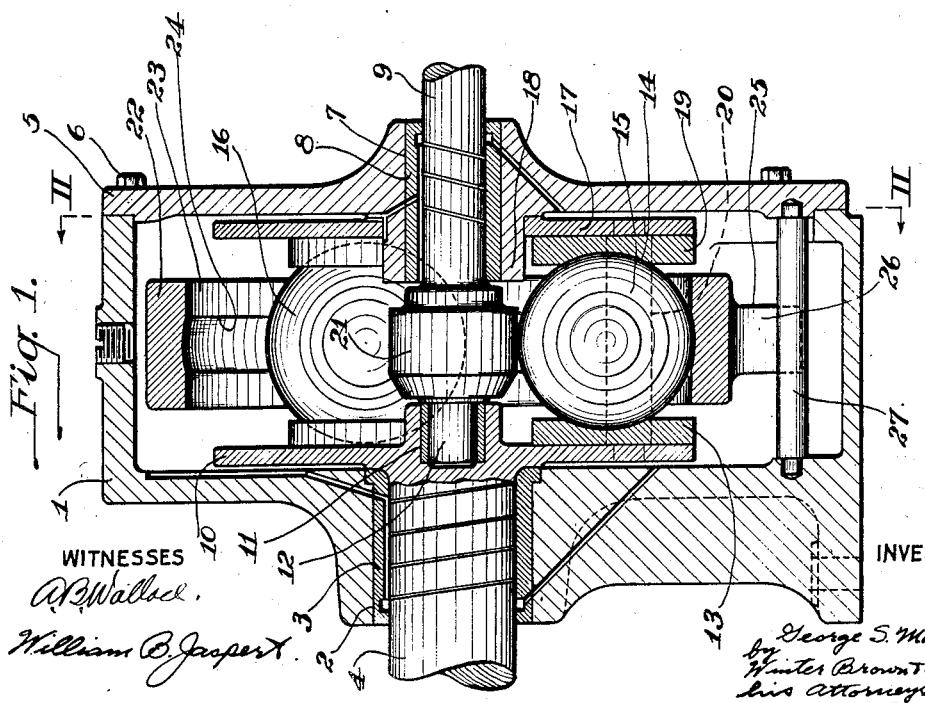
WITNESSES
INVENTOR Patented July 5, 1927.

1,634,507

UNITED STATES PATENT OFFICE.

GEORGE SMITH MORISON, OF PITTSBURGH, PENNSYLVANIA, ASSIGNOR TO MORISON INCORPORATED, OF PITTSBURGH, PENNSYLVANIA, A CORPORATION OF DELAWARE.

BALL TRANSMISSION.

Application filed June 19, 1926. Serial No. 117,167.

This invention relates to gearless transmission, and more particularly to transmission mechanisms for effecting a reduction of speeds between a driving and driven element.

It is among the objects of this invention to provide a gearless transmission of simple, compact, and durable mechanical construction which may be embodied in a compact housing member, to constitute a transmission unit that may be readily associated with or between a driving and driven element, such as a motor or other prime mover and a machine or apparatus which it is designed to operate.

Another object of this invention is to provide a speed reduction mechanism embodying a roller transmission which may be associated with a driving and driven element in such manner as to provide positive driving connection therebetween and which shall effect a reduction of speed between the relatively rotating members proportionate to the dimensions of the roller races.

Another object of this invention is to provide a roller transmission which is associated with an outer race fixed against rotation, a retaining cage member with which the rollers constitute a planetary system, and an inner race, the rollers being of different size to produce a wedging action between the outer and inner race that is effective to revolve the roller members around the inner race, while producing a simultaneous rotation of their retaining cage member and of the driven element with which it is associated.

Still another object of this invention is to provide means for retaining the rollers in suitable angular spaced relation in the cage member and for yieldingly restraining one of the roller members against relative angular movement with respect to the other roller members, yet permitting sufficient displacement to produce the desired wedging effect between the several roller members and their cooperating races.

In my Patent No. 1,568,290, issued January 5, 1926, entitled "Roller eccentric", I have set forth a roller eccentric transmission device adapted for the translation of motion from a rotary driven shaft to an eccentrically movable circular member without tooth gears and without sliding contact surfaces by means of true circular rollers in contact with the driving shaft and the eccentrically movable driven member.

My present invention is based somewhat on the same principles but distinguishes from the subject matter of the aforesaid patent in material elements of construction, for example in that I utilize the principle of the wedging roller members and eccentrically movable driven member in a speed reduction unit having a driving and driven shaft in coaxial alignment, which shafts may be respectively connected to a prime mover and a driven element to effect a reduction in speed. In addition the present invention comprises a different and special working structure for securing such speed reductions through a roller eccentric device by the employment of ball transmission instead of the cylindrical roller members illustrated in my prior device. However, other forms of rollers may be substituted for the ball members in the structure which constitutes the subject matter of the present description, and the term roller as hereinafter specified shall designate both ball and roller members.

In accordance with the principles of this invention the transmission or speed reduction unit to be hereinafter described comprises a housing member having a plurality of shafts journalled for rotation in coaxial alignment, one of said shafts constituting the slow speed or driven element and the other the high speed or driving element, the former being provided with a cage member for retaining a plurality of balls and the other being provided with a race or itself constituting a race, with which the balls are cooperatively engaged. A ring member having an inner race-way is disposed in cooperative alignment with the race of the driving shaft in engagement with the ball members and is adapted for eccentric movement relative to the fixed axes of the driving and driven shafts, but restrained against rotation in the manner hereinafter set forth.

In the accompanying drawing constituting a part hereof and in which like reference characters designate like parts, Fig. 1 is a vertical sectional view partially in elevation of a transmission device embodying the principles of this invention; and Fig. 2 is an end elevational view thereof with the end bracket removed, taken along the line II—II, Fig. 1.

Referring to the several figures of the drawing, the structure therein illustrated comprises a housing member 1 having a central opening 2 provided with a journal bearing 3 for rotatably journalling a shaft member 4. An end bracket 5 is secured by suitable cap bolts 6 to the housing 1 and is provided with a central opening 7 having a journal bearing 8 secured therein for rotatably journalling a shaft member 9.

The shaft 4 is provided with a flange portion 10 and a recess 11 constituting a bearing member for journalling the restricted end portion 12 of the shaft 9. The flange 10 of the shaft 4 is provided with bearing pads 13 having spherical seats 14 for receiving a plurality of balls 15, 16 and 16ª. A disc 17 is loosely mounted on an inwardly projecting portion 18 of the end bracket 5 and is provided with bearing pads 19 corresponding to the pads 13 of the shaft flange 10. The disc 17 is secured to the flange 10 of the shaft 4 by spacing elements 20, Fig. 2, which as shown are in the form of rivets by which the flange 10 and disc 17 are secured in spaced relation to constitute a retaining cage for the ball members 15, 16 and 16ª. The shaft member 9 is provided with a shoulder or sleeve 21 constituting an inner race for the balls. A ring 22, having a concentric race 23 provided with a groove 24 complementary in shape to the spherical faces of the balls is disposed in cooperative alignment with the balls, and the inner race 21 as shown in Fig. 1. The ring 22 is provided with a projecting lug 25 having a slotted opening 26 adapted to engage an anchor pin 27 secured in the housing member, to restrain the ring 22 against rotation while leaving it free for the eccentric movement produced in the manner to be hereinafter set forth.

The ball member 16ª is seated in a floating bearing pad 28 shown in Fig. 2 which is secured by a coil spring 29 to one of the rivets 20 of the cage member, the purpose of which is to permit limited movement of the bearing pad 28 relative to the fixed positions of the other transmission balls.

The operation of this device is briefly as follows: The driving shaft 9 may constitute the armature shaft of an electric motor or the driving shaft of any prime mover or it may be a connecting shaft coupled to the driving shaft of such prime mover through which it is actuated. The rotation of the shaft 9 transmits a rolling motion through the race 21 to the balls 15, 16 and 16ª causing them to rotate about axes parallel to the axis of rotation of the shafts 4 and 9. The balls 15, 16, and 16ª being intimately engaged with the grooved race-way of the ring 22, which is restrained against rotation by the pin 27, will react against the surface of the ring 22 thereby effecting rotation of the cage member by which the balls are engaged in the same direction as the direction of rotation of the drive shaft 9.

The balls 15, 16, and 16ª are of different diameters, ball 15 in the illustration being smaller than the balls 16, and 16ª, this difference in the diameters producing an eccentric disposition of the race 24 with respect to the fixed axis of the rotating shafts. The difference in the diameters of the balls produces a wedging action of the several balls with respect to the race 21 and the race of the eccentrically movable ring 22.

In operation the ball member 16ª that is disposed in the floating bearing pad 28 is termed the wedging ball since it is free to advance in the wedge-shaped space formed between the inner and outer races 21 and 24, this tendency to advance being produced by the reaction of the ball against the outer race and its positive driving engagement with the race 21. The member 16ª is constituted the wedging member for clock-wise rotation of the drive shaft 9. The direction of rotation of the drive shaft 9 imparts a movement to the ball in the same direction tending to revolve the ball 16ª about the axis of the shaft into the narrowing space between the races 21 and 24.

Since the cage member in which the balls are retained is free to rotate, the balls are constituted planetary members and the race 21 and the outer ring 22 are the cooperating sun and orbital members, respectively. This relation of the relatively rotatable members, namely, the shafts 4 and 9, with the member 22 which is fixed against rotation, brings in the characteristic of plus or minus one revolution of the planetary members with respect to the sun or orbit members, respectively, during the travel of a planetary member around its inner or outer path, this being a common and well known characteristic of planetary systems. The effective reduction between the driving and driven shaft members will therefore be determined by the relative peripheral dimensions of the inner and outer races plus 1, so that if the stationary race 23, and the race 21 are designed to produce a three to one ratio the actual speed reduction will be four to one.

The function of the spring 29 is merely to bias the floating bearing pad 28 to initially guide the ball member 16ª mounted thereon into position to act as the wedge, and once the ball has assumed the wedge position it will be held therein independently of the spring member 29.

It is evident from the foregoing description of this invention that a speed reduction transmission made in accordance therewith provides a simple and efficient mechanical device of relatively inexpensive construction and adapted for smooth and silent operation. The cooperative relation of the balls and their associated parts produce a positive drive connection in which the elements do not slip in spite of the fact that the structure illustrated in the figures of the drawing is normally intended to operate with a lubricant.

Although but a single embodiment of the invention has been herein set forth it is obvious that various modifications may be made in the details of construction and in the arrangement and disposition of the several cooperating parts, without departing from the principles herein set forth, and it is further obvious that although the several rotating elements have been designated driving and driven members their functions may be reversed in operation so that the shaft member with which the transmission is associated may constitute the driving element, and the other cooperating shaft the driven element.

I claim:

1. A transmission device comprising a pair of shafts journalled for rotation in coaxial alignment, a cage member adapted to rotate with one of said shafts, a plurality of rollers disposed in said cage in angular spaced relation and revoluble therewith, and a race for said rollers free to move eccentrically but held against rotation, said rollers being wedged between said race and the other of said shafts whereby to transmit rotation from one to the other of said shafts.

2. A transmission device comprising a pair of shafts journalled for rotation in coaxial alignment, a cage member adapted to rotate with one of said shafts and a race provided on the other of said shafts, a ring mounted for eccentric movement with respect to said shaft and secured against rotation, said ring having a race in cooperative alignment with the race of said shaft, and a plurality of rollers disposed between said races, some of said rollers being of different sizes.

3. A transmission device comprising a pair of shafts journalled for rotation in coaxial alignment, a cage member adapted to rotate with one of said shafts and a race provided on the other of said shafts, a ring mounted for eccentric movement with respect to said last named shaft and secured against rotation, said ring having a race in cooperative alignment with the race of its cooperating shaft, and a plurality of rollers disposed between said races, and revoluble with said cage, some of said rollers being of different sizes.

4. A transmission device comprising a pair of shafts journalled for rotation in coaxial alignment, a cage member adapted to rotate with one of said shafts and a ball race provided on the other of said shafts, a ring mounted for eccentric movement with respect to said last-named shaft and secured against rotation, said ring having a race in cooperative alignment with the race of its cooperating shaft, and a plurality of rollers disposed between said races, and revoluble with said cage, one of said rollers being movable relative to the said cage.

5. A transmission device comprising a pair of shafts journalled for rotation in coaxial alignment, a cage member adapted to rotate with one of said shafts and a race provided on the other of said shafts, a ring mounted for eccentric movement and adapted to cooperate with said last named shafts and secured against rotation, said ring having a race in cooperative alignment with the race of said shaft, and a plurality of rollers disposed between said races, and revoluble with said cage, some of said rollers being secured in angular spaced relation in said cage and one of said rollers being yieldingly restrained against angular movement relative to the other of said rollers.

6. A transmission device comprising a housing member, a pair of shafts journalled for rotation in coaxial alignment in said housing, one of said shafts having a flanged end portion and being provided with an opening centrally thereof for journalling the end of the other of said shafts therein, a cage member secured to the flange of said shaft and provided with apertures for receiving roller members, a race provided on one of said shafts, a ring mounted for eccentric movement in said housing but restrained against rotation therein, said ring having a roller race, rollers disposed in the apertures of said cage and between said races, and a roller mounted independently of said cage and yieldingly restrained against relative angular movement therewith.

7. A transmission device comprising a housing member, a pair of shafts journalled for rotation in coaxial alignment in said housing, one of said shafts having a flanged end portion and being provided with an opening centrally thereof for journalling the end of the other of said shafts therein, a cage member secured to the flange of said shaft and provided with bearing faces for receiving roller members, a roller race provided on one of said shafts, a ring mounted for eccentric movement in said housing but restrained against rotation therein, said ring having a race, rollers disposed in the apertures of said cage and between said races and a roller mounted independently of the bearing faces of said cage and having a spring, restraining angular movement thereof relative to said cage member.

8. A transmission device comprising a housing member, a pair of shafts journalled for rotation in coaxial alignment in said housing, one of said shafts having a flanged end portion and being provided with an opening centrally thereof for journalling the end of the other of said shafts therein, a cage member secured to the flange of said shaft, bearing pads disposed in angular spaced relation and secured to said cage, a ring mounted for eccentric movement in said housing and locked against rotatory movement therein, a plurality of rollers disposed between the bearing pads of said cage and adapted to operatively engage said ring and one of said shafts, a roller mounted independently of said cage, and a spring element for wedging said last named roller between said eccentrically movable ring and said last named shaft.

9. A transmission device comprising a pair of shafts journalled for rotation in axial alignment, a cage member adapted to drive one of said shafts, a plurality of unequally sized rollers carried by said cage in angular spaced relation free to rotate and revoluble with the cage, and an outer race for said rollers, said race being held against rotation but free to move eccentrically with respect to the shafts, the rollers bearing on one of the shafts and on the eccentric race, whereby to translate rotary motion between said shafts.

10. In a transmission device comprising a driving shaft, a plurality of rolling members bearing on said shaft and angularly spaced apart thereon, two of said rolling members being of unequal diameters, a ring member having an inner race mounted on said rolling members, said ring being eccentrically mounted with respect to said shaft and adapted to be driven eccentrically by revolution of said rolling members about the shaft, and constantly operative resilient means to urge the rolling members into normal working position between said shaft and said ring.

In testimony whereof, I sign my name

GEORGE SMITH MORISON.